United States Patent
Bae

(10) Patent No.: US 9,948,480 B2
(45) Date of Patent: Apr. 17, 2018

(54) MEDIA ACCESS CONTROL FILTERING APPARATUS FOR HIGH SPEED SWITCHING AND OPERATING METHOD THEREOF

(71) Applicant: LSIS CO., LTD., Anyang-si, Gyeonggi-do (KR)

(72) Inventor: Gyu Sung Bae, Gunpo-si (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 57 days.

(21) Appl. No.: 14/601,983

(22) Filed: Jan. 21, 2015

(65) Prior Publication Data
US 2015/0215188 A1 Jul. 30, 2015

(30) Foreign Application Priority Data
Jan. 27, 2014 (KR) .................. 10-2014-0009344

(51) Int. Cl.
*H04L 12/43* (2006.01)
*H04L 12/427* (2006.01)
*H04L 12/413* (2006.01)
*H04L 12/42* (2006.01)

(52) U.S. Cl.
CPC ............ *H04L 12/43* (2013.01); *H04L 12/413* (2013.01); *H04L 12/42* (2013.01); *H04L 12/427* (2013.01)

(58) Field of Classification Search
None
See application file for complete search history.

(56) References Cited

U.S. PATENT DOCUMENTS

| 5,140,587 A | * | 8/1992 | Mueller | H04L 12/43 370/460 |
| 5,926,626 A | * | 7/1999 | Takeuchi | H04L 12/4625 709/249 |
| 6,028,837 A | | 2/2000 | Miller | |
| 6,909,717 B1 | * | 6/2005 | Higgins | H04L 12/64 370/394 |
| 7,310,664 B1 | * | 12/2007 | Merchant | H04L 41/0886 709/220 |
| 2002/0075886 A1 | | 6/2002 | Tagore-Brage et al. | |
| 2013/0215743 A1 | * | 8/2013 | Pannell | H04L 47/564 370/230.1 |

FOREIGN PATENT DOCUMENTS

EP 1906598 4/2008

OTHER PUBLICATIONS

European Patent Office Application Serial No. 15152303.2, Search Report dated Aug. 26, 2015, 9 pages.

* cited by examiner

*Primary Examiner* — Joseph A Bednash
(74) *Attorney, Agent, or Firm* — K&L Gates LLP

(57) ABSTRACT

A media access control (MAC) filtering method is provided. The MAC filtering method includes setting a variable of condition on a target frame to be re-transmitted, with a relay control logic; receiving data from a physical layer; storing the received data in a relay buffer; determining whether to re-transmit the receive data; monitoring a transmission state of a MAC control logic and transmitting the received data while the MAC control logic is not used, to prevent data collision, when as a result of the determination that the receive data needs to be re-transmitted; and storing information that the received data is being transmitted, into a transmit state memory in the MAC control logic, when the received data is transmitted.

13 Claims, 4 Drawing Sheets

[Fig. 1]
(Prior Art)
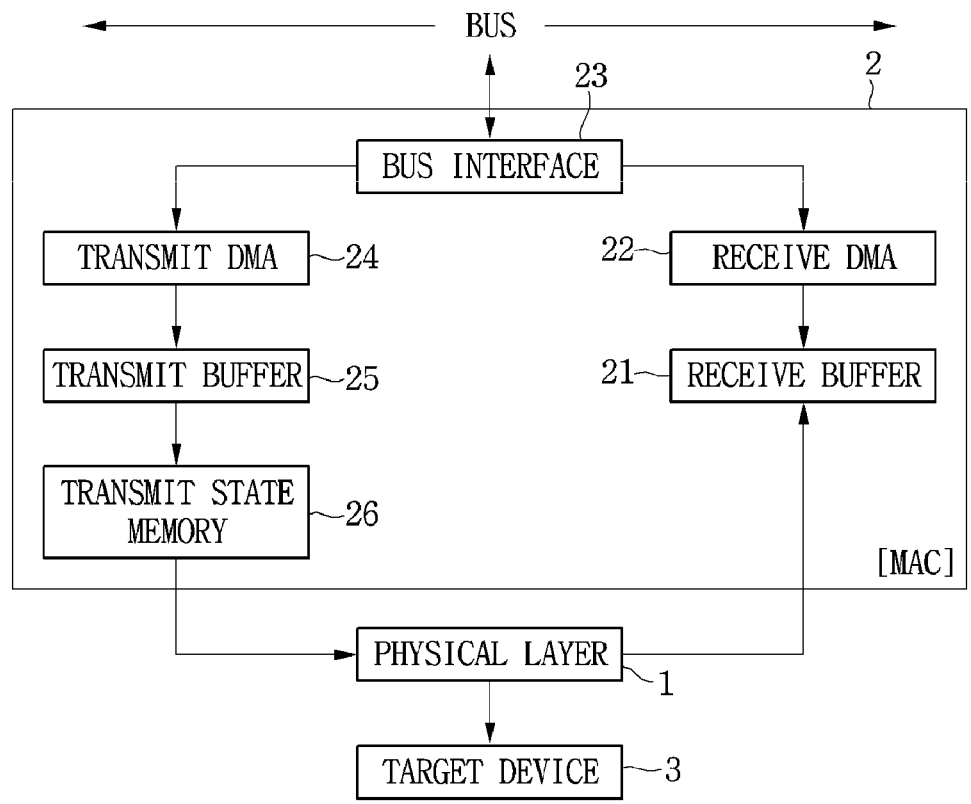

[Fig. 2]
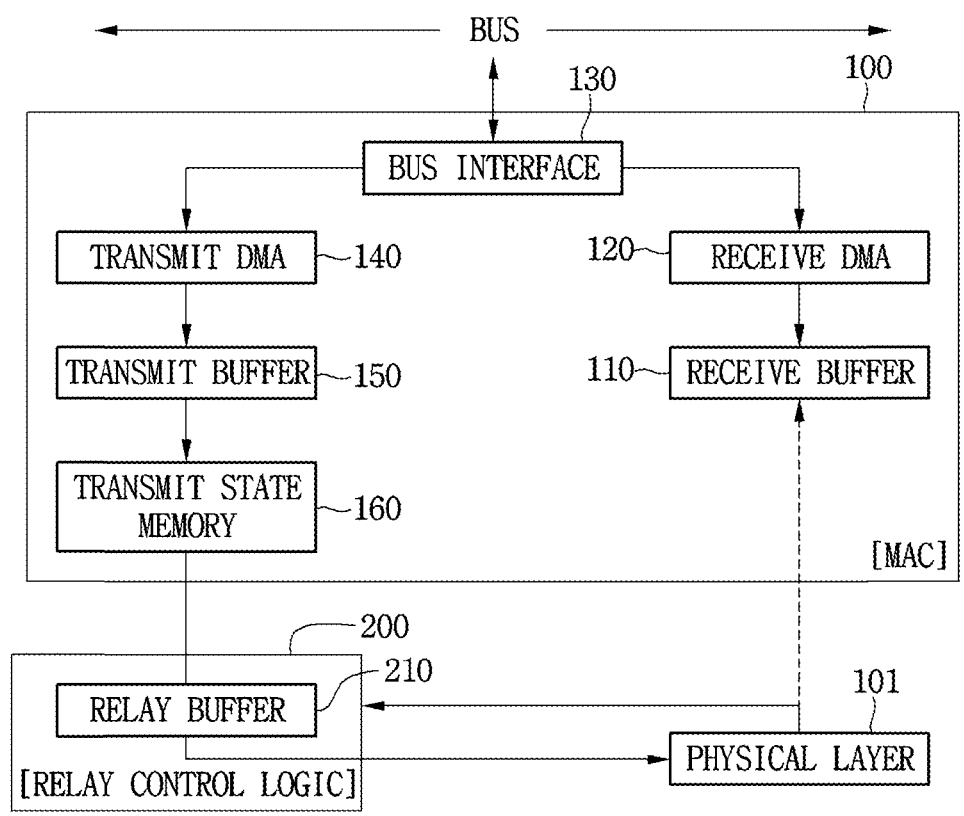

[Fig. 3]
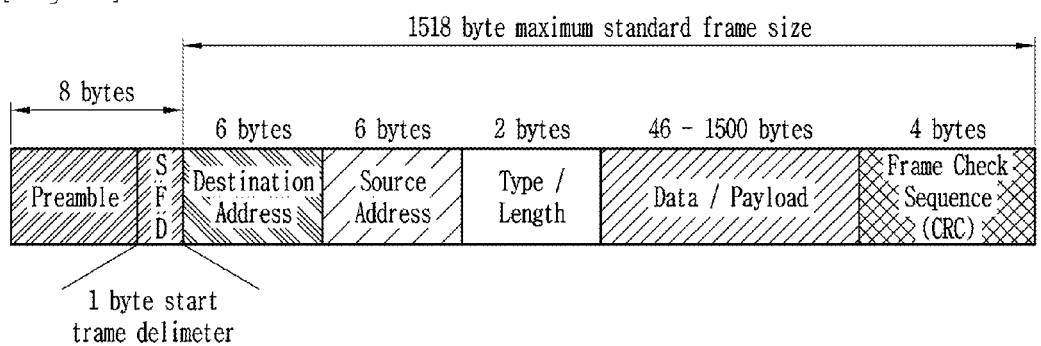

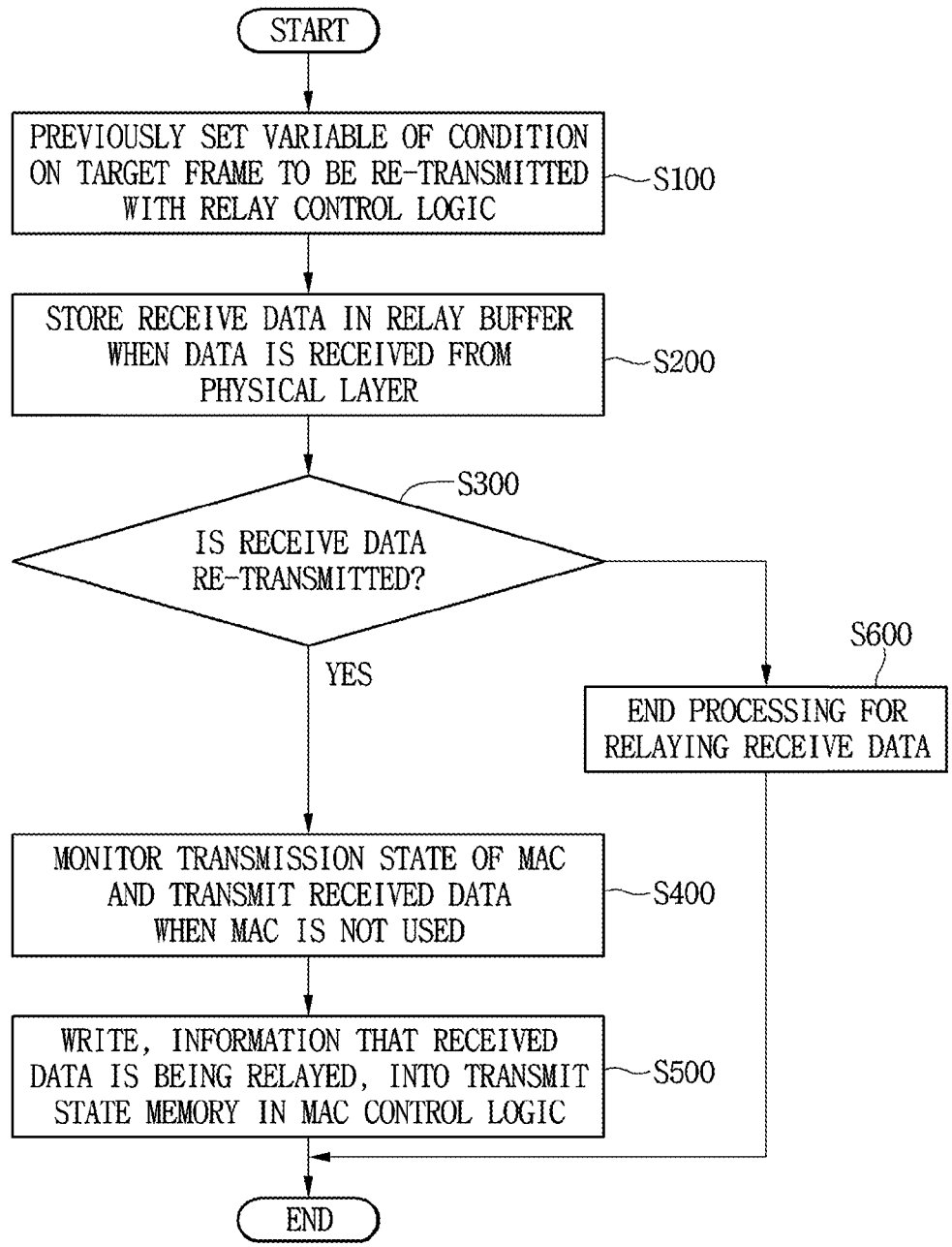

MEDIA ACCESS CONTROL FILTERING APPARATUS FOR HIGH SPEED SWITCHING AND OPERATING METHOD THEREOF

CROSS-REFERENCE TO RELATED APPLICATIONS

Pursuant to 35 U.S.C. § 119(a), this application claims the benefit of earlier filing date and right of priority to Korean Patent Application No. 10-2014-0009344, filed on Jan. 27, 2014, the contents of which are hereby incorporated by reference herein in its entirety.

BACKGROUND

The present disclosure relates to a media access control (MAC) filtering apparatus for high speed switching and more particularly, to a technology to determine by using hardware whether to re-transmit received data when performing Ethernet communication to transmit data through high speed switching.

In general, there are many kinds of topology including a bus topology, a tree topology, a star topology, a ring topology, and a mesh topology.

Among others, the ring topology is a closed loop topology having no start and end points, unlike the bus topology.

Thus, the ring topology does not need a terminator and transmits data in a different method from that of the bus topology. That is, only a point having a token circulating in a ring may transmit data.

It is a means for preventing a collision in the ring topology.

The point having the token transmits the token along with data to a target device.

However, since data is transmitted only in one direction in this form, it takes a long time to transmit the data to a point before a start point.

Also, a node fault affects the entire topology.

There is a dual-ring topology in which nodes are connected using two rings in order to solve such a limitation.

That is, this form enables two-way transmission in addition to one-way transmission and provides redundancy.

Thus, even if one node has a fault, it is possible to transmit data to another node and thus, the dual-ring topology is more stable than a single ring topology. A technology for enabling data to be more quickly transmitted has been proposed for the dual-ring topology.

In order to transmit data received on the Ethernet to another node in the related art, data is stored in a memory by using the RX state machine, receive buffer 21, and receive direct memory access (DMA) 22 of Ethernet MAC, and then stored data is compared with fields such as destination address, source address and Ethernet type by using software to determine a frame to be transferred, as shown in FIG. 1.

When there is a frame to be transmitted, it is possible to transmit data from a memory to a transmit buffer through transmit DMA 24 to provide a Tx state command to a transmit state memory 26 to transmit the frame.

As such, according to a typical transmission method, since a receive frame is received, determined by using software, and then re-transmitted, many resources and much time are consumed.

Such general Ethernet reception and transmission perform operations as shown in FIG. 1.

Receive data being a digital signal is received from a physical layer 1, stored in the receive buffer 21 of the MAC 2 and then stored in a higher memory through a system bus. Stored data is processed in a higher program, data to be transmitted is generated to be stored in the transmit buffer 25 through a system bus and then, transmit data is transmitted to the physical layer 1 according to the control of the MAC to complete transmission.

If a typical Ethernet system is not a switch but a general device, Ethernet receive functions all need to be activated to store a frame in a memory and perform MAC filtering through software in order to receive data (frame) and then transmit the data to another node and Ethernet transmit operations and order need to be maintained in order to transmit the data to another node.

Since such a typical Ethernet system needs frame reception, MAC filtering through software and transmission, much time and many physical resources are consumed.

SUMMARY

Embodiments provide a MAC filtering method for high speed switching that enables high speed data transmission by determining by hardware whether to transmit data from a MAC side and immediately transmitting data stored in a relay buffer when there is a need to re-transmit data in Ethernet communication.

In one embodiment, a media access control (MAC) filtering method for high-speed switching includes setting a variable of condition on a target frame to be re-transmitted, with a relay control logic; receiving data from a physical layer; storing the received data in a relay buffer; determining whether to re-transmit the receive data; monitoring a transmission state of a MAC control logic and transmitting the received data while the MAC control logic is not used, to prevent data collision, when as a result of the determination that the receive data needs to be re-transmitted; and storing information that the received data is being transmitted, into a transmit state memory in the MAC control logic, when the received data is transmitted.

The variable of the condition may include a destination address (DA), a source address (SA), and a type/length.

Determining whether to re-transmit the received data may analyze data on an Ethernet frame and determine preamble, DA, SA, and type fields, and a MAC filtering condition set by a user.

The MAC filtering method may further include setting the variable of the condition further comprises setting a variable enabling time of transmitting the received data to be controlled for operations and speeds of a network and system.

The details of one or more embodiments are set forth in the accompanying drawings and the description below. Other features will be apparent from the description and drawings, and from the claims.

BRIEF DESCRIPTION OF THE DRAWINGS

FIG. 1 is a block diagram of a typical switching system.

FIG. 2 is a functional block diagram of a media access control (MAC) filtering device for high-speed switching according to an embodiment.

FIG. 3 is a diagram representing an Ethernet frame structure according to FIG. 2.

FIG. 4 is a flow chart of a MAC filtering method for high-speed switching according to an embodiment.

DETAILED DESCRIPTION OF THE EMBODIMENTS

In the following, a media access control (MAC) filtering device and method for high-speed switching according to an embodiment are described in detail with reference to the accompanying drawings.

FIG. 2 is a functional block diagram of a MAC filtering device for high-speed switching according to an embodiment.

As shown in FIG. 2, the MAC filtering device for high-speed switching according to an embodiment includes a MAC control logic 100 and a relay control logic 200.

The MAC control logic 100 determines whether to re-transmit received data. Such a MAC control logic 100 receives data being a digital signal from a physical layer 101, stores the received data in a receive buffer and then stores the data in a higher memory through a linked system bus. The MAC control logic 100 processes stored received data through a higher program, generates transmit data to be transmitted, stores the data in a transmit buffer through a system bus and then transmits transmit data to the physical layer 101 according to control to complete data transmission.

In addition, the relay control logic 200 includes a relay buffer 210 that previously registers a variable in a condition on a target frame to be re-transmitted, copies and stores received data when data is received from the physical layer 101, and the relay control logic monitors the transmit state of the MAC to transmit data when it is not used.

When received data is relayed, such a relay control logic 200 may write information that relaying is implemented, into a Tx state memory in the MAC control logic 100. As such, as the relaying of received data is written into the Tx state memory in the MAC control logic 100, there is an effect in that it is possible to prevent repetitive processing that results in the MAC control logic 100 re-relaying received data.

The variable in the condition may include destination address (DA), source address (SA), type/length and transmission time information.

In this case, the MAC control logic 100 may analyze received data on an Ethernet frame to determine preamble, DA, SA, and type fields and a MAC filtering condition set by a user to determine whether to re-transmit received data.

Also, the relay control logic 200 may set a variable to be capable of controlling a transmit time for the operations and speeds of a network and system.

FIG. 4 is a flow chart of a MAC filtering method for high-speed switching according to an embodiment.

Firstly, a variable in a condition on a target frame to be re-transmitted is previously set with the relay control logic 200 in step S100.

When data is received from a physical layer, received data is stored in the relay buffer 210 in step S200.

Then, it is determined whether to re-transmit received data in step S300. In this example, determining whether to re-transmit the received data may include analyzing data on an Ethernet frame to determine preamble, DA, SA, and type fields and a MAC filtering condition set by a user.

When there is a need to re-transmit received data (YES in step S300), the transmit state of the MAC is monitored to relay the received data when it is not used in step S400 because data collision occurs.

Then, information that the received data is being relayed is written into the Tx state memory in the MAC control logic 100 in step S500.

When there is no need to relay the received data (NO in step S300), processing for re-transmitting the received data ends in step S600.

The variable in the condition includes a DA, a SA, and a type/length and transmission time information.

The MAC filtering device and method for high-speed switching according to the embodiment having the above-described configuration need much time and many resources when high-speed data transmission is needed, because a received frame is stored in a memory and a program analyzes the frame to process data to be transmitted as in the typical method, but the MAC filtering device and method for high-speed switching have an effect of enabling high-speed data transmission in that MAC side includes CAM, DA, SA and type/length filtering logic and immediately transmit the frame.

According to an embodiment, a variable is set to be capable of controlling a transmit time for the operations and speeds of a network and system. As such, by setting the variable to be capable of controlling the transmit time, it is possible to transmit a frame after completion reception or also possible to transmit data as soon as the data is received.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A media access control (MAC) filtering method for high-speed switching in a MAC filtering apparatus, the apparatus comprising a physical layer, a MAC control logic connected to the physical layer and a relay control logic connected to the physical layer, the MAC filtering method comprising:

setting a variable of condition on a target frame to be re-transmitted, with the relay control logic;

receiving, by the relay control logic, data from the physical layer;

storing, by the relay control logic, the received data in a first buffer included in the relay control logic;

receiving, by the MAC control logic, the data from a physical layer;

storing, by the MAC control logic, the received data in a second buffer included in the MAC control logic;

determining, by the relay control logic, whether to re-transmit the data stored in the first buffer based on the set variable of condition on the target frame;

monitoring, by the relay control logic, a transmission state of another data in the MAC control logic when it is determined that the data stored in the first buffer needs to be re-transmitted;

re-transmitting, by the relay control logic, the data stored in the first buffer at the time when the MAC control logic is not used for transmission of another data;

storing, by the relay control logic, information that the data stored in the first buffer is being re-transmitted, into a transmission state memory in the MAC control logic, when the data stored in the first buffer is re-transmitted; and in response to storing information that the data stored in the first buffer is being re-transmitted, not re-transmitting the data from the second buffer of the MAC control logic.

2. The MAC filtering method according to claim 1, wherein in setting the variable of the condition, the variable of the condition comprises a destination address (DA), a source address (SA), and a type/length.

3. The MAC filtering method according to claim 2, wherein in setting the variable of the condition, the variable of the condition further comprises information on a transmission time.

4. The MAC filtering method according to claim 1, wherein determining whether to re-transmit the data stored in the first buffer comprises analyzing data on an Ethernet frame and determining based on preamble, DA, SA, and type fields whether to re-transmit.

5. The MAC filtering method according to claim 4, wherein determining whether to re-transmit the data stored in the first buffer further comprises determining based on a MAC filtering condition set by a user.

6. The MAC filtering method according to claim 1, wherein setting the variable of the condition further comprises setting a variable enabling time of transmitting the data stored in the first buffer to be controlled for operations and speeds of a network and system.

7. A MAC filtering apparatus comprising:
a physical layer;
a MAC control logic connected to the physical layer and configured to receive data from the physical layer and to store the received data in a second buffer included in the MAC control logic; and
a relay control logic connected to the physical layer and configured to:
set a variable of a condition on a target frame to be re-transmitted;
receive the data from the physical layer;
store the received data in a first buffer included in the relay control logic;
determine whether to re-transmit the data stored in the first buffer based on the set variable of condition on the target frame;
monitor a transmission state of another data in the MAC control logic when it is determined that the stored data needs to be re-transmitted;
re-transmit the data stored in the first buffer at the time when the MAC control logic is not used for transmission of another data;
store information that the data stored in the first buffer is being re-transmitted, into a transmission state memory in the MAC control logic, when the data stored in the first buffer is re-transmitted; and
in response to storing information that the data stored in the first buffer is being re-transmitted, not re-transmitting the data stored from the second buffer of the MAC control logic.

8. The MAC filtering apparatus according to claim 7, wherein the variable of the condition comprises a DA, SA, and a type/length.

9. The MAC filtering apparatus according to claim 8, wherein the variable of the condition further comprises information on a transmission time.

10. The MAC filtering apparatus according to claim 7, wherein the MAC control logic analyzes the received data and determines based on preamble, DA, SA and type fields whether to re-transmit.

11. The MAC filtering apparatus according to claim 10, wherein the MAC control logic further determines based on a MAC filtering condition set by a user whether to re-transmit.

12. The MAC filtering apparatus according to claim 7, wherein the relay control logic configured to further set a variable controlling enabling time of transmitting the received data for operations and speeds of a network and system.

13. The MAC filtering apparatus according to claim 12, wherein the MAC control logic receives digital signal data from the physical layer, stores the received digital signal data in a buffer, and stores the received digital signal data stored in the buffer in a higher memory, through a system bus.

* * * * *